United States Patent

Gurak et al.

[15] 3,641,437

[45] Feb. 8, 1972

[54] MAXIMAL-RATIO DIVERSITY RECEIVING SYSTEM

[72] Inventors: Richard J. Gurak, Summit; Milton D. Reicher, Parkridge, both of N.J.

[73] Assignee: International Telephone and Telegraph Corporation, Nutley, N.J.

[22] Filed: Aug. 14, 1970

[21] Appl. No.: 70,624

[52] U.S. Cl. ....................325/305

[51] Int. Cl. ....................H04b 1/06

[58] Field of Search ....................325/56, 301, 303, 305, 306; 320/154, 156; 343/205, 206

[56] References Cited

UNITED STATES PATENTS

| | | | |
|---|---|---|---|
| 3,444,471 | 5/1969 | French | 325/305 X |
| 3,475,688 | 10/1969 | Masonson | 325/305 |
| 3,566,274 | 2/1971 | Di Toro | 325/305 |

*Primary Examiner*—Richard Murray

*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

*n* RF diversity signals are routed to separate channels and heterodyned to *n* IF signals having the same IF frequency. The IF signals are linearly combined to provide a common IF signal from which an AGC signal is generated and is used to control the gain of each IF signal produced to assure a constant amplitude, common IF signal. This common IF signal is also used as a reference signal for a phase comparator in each channel. Each phase comparator compares the phase of its associated IF signal to the reference signal and adjusts its associated IF signal to be inphase with the other IF signals. A variable impedance diode is coupled to be responsive to each IF signal. The impedance of each diode is controlled by comparing the amplitude of the associated IF signal to the remaining $(n-1)$ IF signals. The IF signal output of each diode is combined to provide a maximal-ratio combined IF signal for utilization in the remainder of the receiver.

10 Claims, 6 Drawing Figures

INVENTORS
RICHARD J. CURAK
BY MILTON D. REICHER
Alfred C. Hill
AGENT

INVENTORS
RICHARD J. GURAK
BY MILTON D. REICHER
Alfred C. Hill
AGENT

INVENTORS
RICHARD J. GURAK
BY MILTON D. REICHER
Alfred C. Hill
AGENT

INVENTORS
RICHARD J. GURAK
BY MILTON D. REICHER
Alfred C. Hill
AGENT

INVENTORS
RICHARD J. CURAK
BY MILTON D. REICHER
Alfred C. Hill
AGENT

INVENTORS
RICHARD J. GURAK
BY MILTON D. REICHER
Alfred C. Hill
AGENT

MAXIMAL-RATIO DIVERSITY RECEIVING SYSTEM

BACKGROUND OF THE INVENTION

This invention relates to radio diversity receiving systems responsive to angularly modulated carrier waves and more particularly to a radio diversity receiving system of the predetection combining type.

One of the difficulties encountered by radio systems for long distance communication is that of fading, generally regarded as resulting from the interference at the receiving system between those transmitted radio waves which have followed paths of different effective lengths. Heretofore, this phase difficulty has been attacked by various forms of diversity systems, such as, space diversity, frequency diversity, time diversity or angle diversity systems, as fully described in U.S. Pat. No. 3,195,049.

Diversity has received widespread success especially with present day long distance troposcatter communication systems. Because of the weak, rapidly fading signals inherent to troposcatter conditions, these systems employ modulation techniques that provide a signal-to-noise enhancement, such as is obtainable with FM (frequency modulation) techniques, in conjunction with diversity reception to provide high quality, reliable communications.

One technique for operating on FM signals in a diversity receiver has been termed the "signal selection technique." With this type of receiving technique, the stronger of the two signals is accepted and the weaker of the two signals is rejected. It was found that this type of receiving technique did not provide as much of an advantage as compared to predetection combining techniques, since both of the channels of a dual diversity system, or all of the channels of a multiple diversity receiving system, contribute to the combined IF (intermediate frequency) signal output resulting in an advantage in long distance scatter-type communication systems.

One form of IF predetection combining system has been termed an "equal gain" combining system. In this system, the IF signals are generated to have equal frequencies and to have a phase relationship so that the IF signals can be combined inphase and at the same relative level that they are received. The output signal of the combiner, the common IF signal, is utilized to generate an automatic gain control (AGC) signal which is applied in common to the IF amplifiers of the diversity receiver to assure a constant amplitude, common IF signal at the output of the combiner.

Still another form of predetection combining system is called the "maximal-ratio" or "ratio-squared" combining system which is the most effective diversity combining system affording the greatest potential in signal reception reliability. This type of combining technique is similar to equal gain combining except for the method of controlling the gain for each predetected IF signal. Equal gain combining requires that the relative gain for each predetected IF signal be the same, where as maximal-ratio combining requires that the gain for each predetected IF signal be proportional to the signal level itself. In the resultant common IF output signal, the weaker signal is controlled to contribute a proportionally small amount of itself than does the stronger signal of the combining signal. The common AGC voltage of the equal gain combining technique is still employed in the maximal-ratio combining arrangement to maintain the correct ratio of the IF signals at the input to the combiner.

Our copending application, Ser. No. 804,175, filed Mar. 4, 1969 and assigned to the same assignee as the present application discloses therein an equal gain diversity receiving system with squelch. In this receiving system, a diode is disposed in each of the signal paths prior to combining with the diodes being under control of a squelch circuit which responds to the AGC signal and the relative carrier ratios of the two IF signals. The squelch diodes supply no attenuation when the relative carrier ratios are less than a predetermined value and the squelch diode associated with the weaker IF signal supplies substantial attenuation when one of the relative carrier ratios is equal to or greater than the predetermined value. This arrangement produces a near maximal-ratio operation.

The above-cited U.S. Pat. points out the various advantages of predetection combining techniques with the primary advantage thereof being to increase the probability that the receiver threshold is exceeded for a greater percentage of the time, thereby improving communication reliability.

SUMMARY OF THE INVENTION

An object of this invention is to provide still another type of predetection combining diversity receiving system.

Another object of this invention is to provide a diversity receiving system for combining substantially inphase a plurality of FM signals employing maximal-ratio combining techniques.

Still another object of this invention is to provide a diversity receiving system of the maximal-ratio combining type which is achieved by modifying the equal gain combining with signal squelch circuit arrangement disclosed in the above-identified copending application.

A feature of this invention is the provision of a diversity receiving system of the predetection combining type comprising *n* sources of signals, the signals of each of the sources having random phase relation with respect to each other, where *n* is an integer greater than one; first means coupled to the sources to provide *n* IF signals each having the same frequency; *n* gain control means each coupled to the first means responsive to a different one of the IF signals; *n* variable impedance means each coupled to a different one of the gain control means; second means coupled to the gain control means to linearly combine the IF signals; third means coupled to the output of the second means, the output of each of the gain control means and the first means to vary the phase relation of the IF signals to render the IF signal inphase at the outputs of the first means; fourth means coupled to the output of the second means to produce a control signal for coupling to each of the gain control means to control the amplitude of each of the IF signals to produce a constant amplitude signal at the output of the second means; fifth means coupled to the output of each of the gain control means and each of the variable impedance means to control the impedance of each of the variable impedance means to provide square law signal addition; and sixth means coupled to each of the variable impedance means to combine the IF signals and provide a maximal-ratio combined output IF signal for the system.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENT

Figure 1:
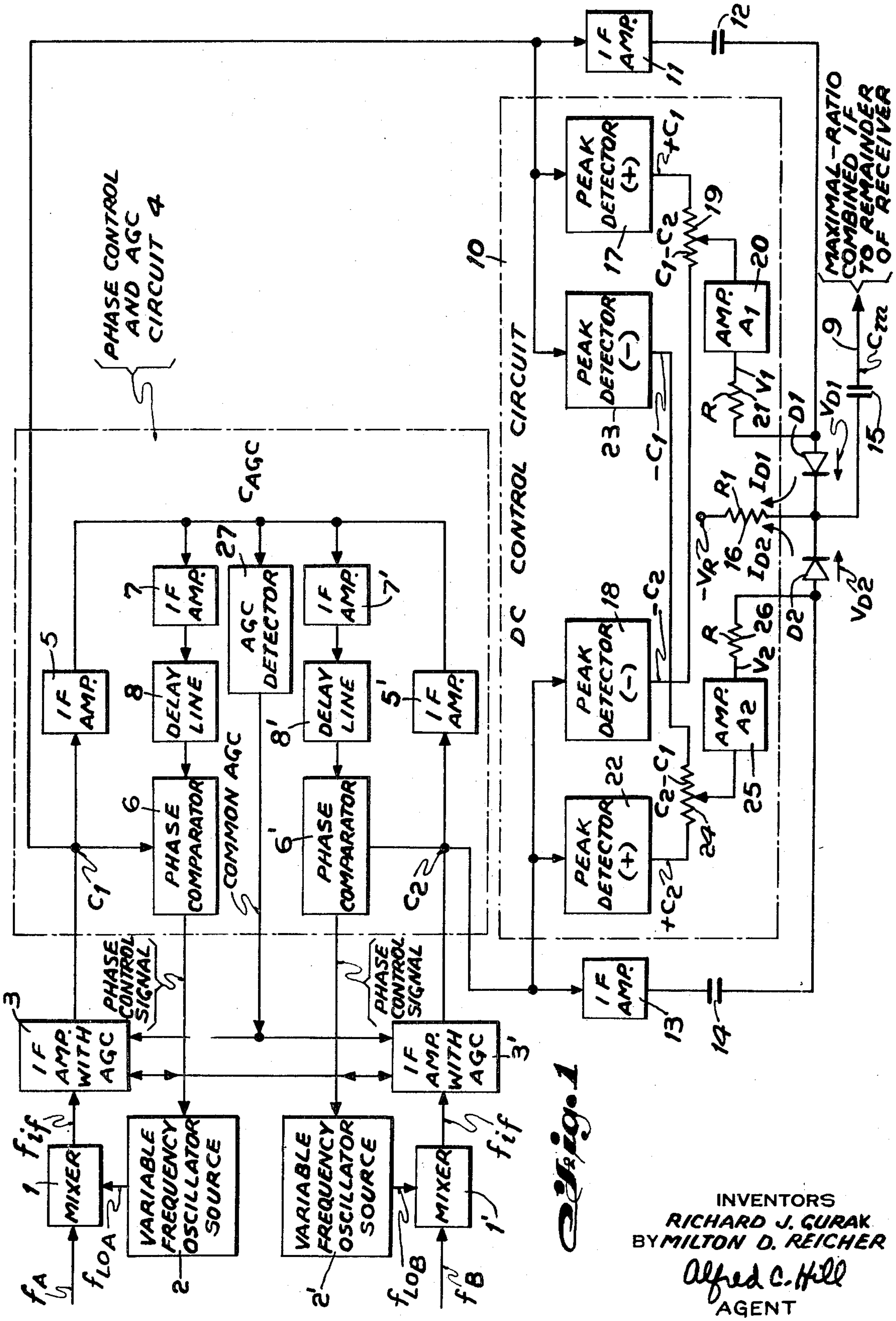
FIG. 1 is a block diagram of a dual diversity receiving system employing the maximal-ratio combining technique in accordance with the principles of the present invention.

Referring to FIG. 1, there is illustrated therein a diversity receiving system incorporating the maximal-ratio combining technique in accordance with the principles of this invention for a dual diversity receiving system. Two RF (radio frequency) diversity signals $f_A$ and $f_B$ are routed to separate diversity signal channels. The two diversity signals, $f_A$ and $f_B$, will have a RF particular frequency depending upon the type of diversity technique employed. The type of diversity techniques which may produce diversity signals $f_A$ and $f_B$ are fully disclosed in the above-cited patent.

The two diversity signals $f_A$ and $f_B$ are applied to two separate channels each of which includes mixer 1, variable frequency oscillator source 2 and IF amplifier 3 with AGC. The requirement of mixers 1 and 1' together with their oscillator sources 2 and 2' is to provide two IF signals $f_U$ having the same frequency for application to IF amplifiers 3 and 3'. If the RF signals, $f_A$ and $f_B$ are of different frequencies, as would be the case in a frequency diversity system, the frequencies $f_{LOA}$ and $f_{LOB}$ would be different so as to provide the same IF frequency output from mixers 1 and 1'. The IF signals $C_1$ and $C_2$ are then coupled to a phase control and AGC circuit 4 which includes therein an IF amplifier 5 for each of the signals $C_1$ and $C_2$. The outputs of amplifiers 5 and 5' are linearly combined on conductor 5a and used as a reference signal for phase comparators 6 and 6'. The common IF reference signal is coupled through IF amplifiers 7 and delay lines 8 prior to application to comparators 6. The other input of comparator 6 is coupled to the output of amplifier 3 and the other input of comparator 6' is coupled to the output of amplifier 3'. Comparators 6 produce phase control signals which are coupled to oscillator sources 2 to vary the phase relation of the two IF signals produced by mixers 1 to be inphase at the output thereof for inphase combining on conductor 5a and at output 9 where the maximal-ratio combined IF signal is present.

Delay lines 8 are provided to compensate for phase shifts in other circuit components in the signal paths so that the reference signal and the associated IF signal are disposed in a 90° phase relationship when the IF signals are inphase. Under this condition, the phase control from comparators 6 would be zero.

AGC detector 27 is coupled to conductor 5a to provide a common AGC control signal for amplifiers 3 to ensure a constant amplitude common IF signal on conductor 5a. Conductor 28 interconnects common circuit points in amplifiers 3 to compensate for circuit variations in these amplifiers and particularly circuit variations due to temperature variations.

The IF signals $C_1$ and $C_2$ are also coupled to a DC control circuit 10. IF signal $C_1$ is also coupled through IF amplifier 11 and DC isolation capacitor 12 to the input electrode of variable impedance diode D1. The IF signal $C_2$ is also coupled through IF amplifier 13 and DC isolation capacitor 14 to the input electrode of variable impedance diode D2. The output electrodes of diodes D1 and D2 are coupled to common output 9 through DC isolation capacitor 15.

The DC control circuit 10 includes a reference voltage $-V_R$ coupled through resistor 16 to the output electrodes of diodes D1 and D2. In addition, positive peak detector 17 is coupled to be responsive to IF signal $C_1$ and negative peak detector 18 is coupled to be responsive to IF signal $C_2$. The outputs of detectors 17 and 18 are algebraically combined in resistor 19 with this algebraically combined result being amplified in amplifier 20 to provide control voltage V1 which is coupled through resistor 21 to the input electrode of diode D1 to thereby adjust the impedance of diode D1 which is proportional to the difference in carrier levels ($C_1$–$C_2$).

Circuit 10 also includes positive peak detector 22 responsive to IF signal $C_2$ and negative peak detector 23 responsive to IF signal $C_1$. The outputs of detectors 22 and 23 are algebraically combined at resistor 24 with the resultant DC voltage being amplified by amplifier 25 to produce a control voltage V2 for coupling through resistor 26 to the input electrodes of variable impedance diode D2. Thus, the impedance of diode D2 is adjusted which is proportional to the difference in carrier levels ($C_2$–$C_1$).

The following discussion will provide a mathematical proof that the combined IF signals at output 9 are combined on a square law, or a maximal-ratio basis.

Maximal-ratio combining differs from other predetection combining techniques only in the manner in which the signal gain for each diversity channel is controlled prior to combining for utilization in the remainder of the receiver.

Equation (1) represents the combined carrier-to-noise ratio for any predetection combining system with ($n$) diversity channels $$\frac{C_0}{N_0}=\frac{K_1C_1+K_2C_2+\ldots K_nC_n}{\sqrt{(K_1N_1)^2+(K_2N_2)^2+\ldots(K_nN_n)^2}} \qquad (1)$$

where $C_1, C_2 \ldots C_n$ = received carrier signal levels; $N_1, N_2 \ldots N_n$ = diversity channel noise levels and $K_1, K_2 \ldots K_n$ = diversity channel signal gains.

For predetection, maximal-ratio combining, the individual channel gains ($K_n$) are proportional to the carrier signal level ($C_n$) in that channel. Equation (1) for two diversity channels ($n$=2) reduces to:

$$\frac{C_0}{N_0}=\frac{C_1^2+C_2^2}{\sqrt{(C_1N_1)^2+(C_2N_2)^2}}$$

If $N_1=N_2$, which is usually the case:

$$\frac{C_0}{N_0}=\frac{\sqrt{C_1^2+C_2^2}}{N} \qquad (2)$$

For equal inputs, $C_1=C_2$, equation (2) becomes:

$$\frac{C_0}{N_0}=\sqrt{2}\,\frac{C_1}{N}=\sqrt{2}\,\frac{C_2}{N}$$

For a complete fade of one of the carrier signals $C_1$ or $C_2$ = 0, equation (2) becomes:

$C_0/N_0=C_2/N$ at $C_1=0$ $C_0/N_0=C_1/N$ at $C_2=0$

In a reduction to practice of the receiving system of FIG. 1, diodes D1 and D2 were hot carrier diodes, such as, Solitron MS 7330 diodes, and the operating frequency of the IF signals is 70 megahertz (MHz).

Figure 3:
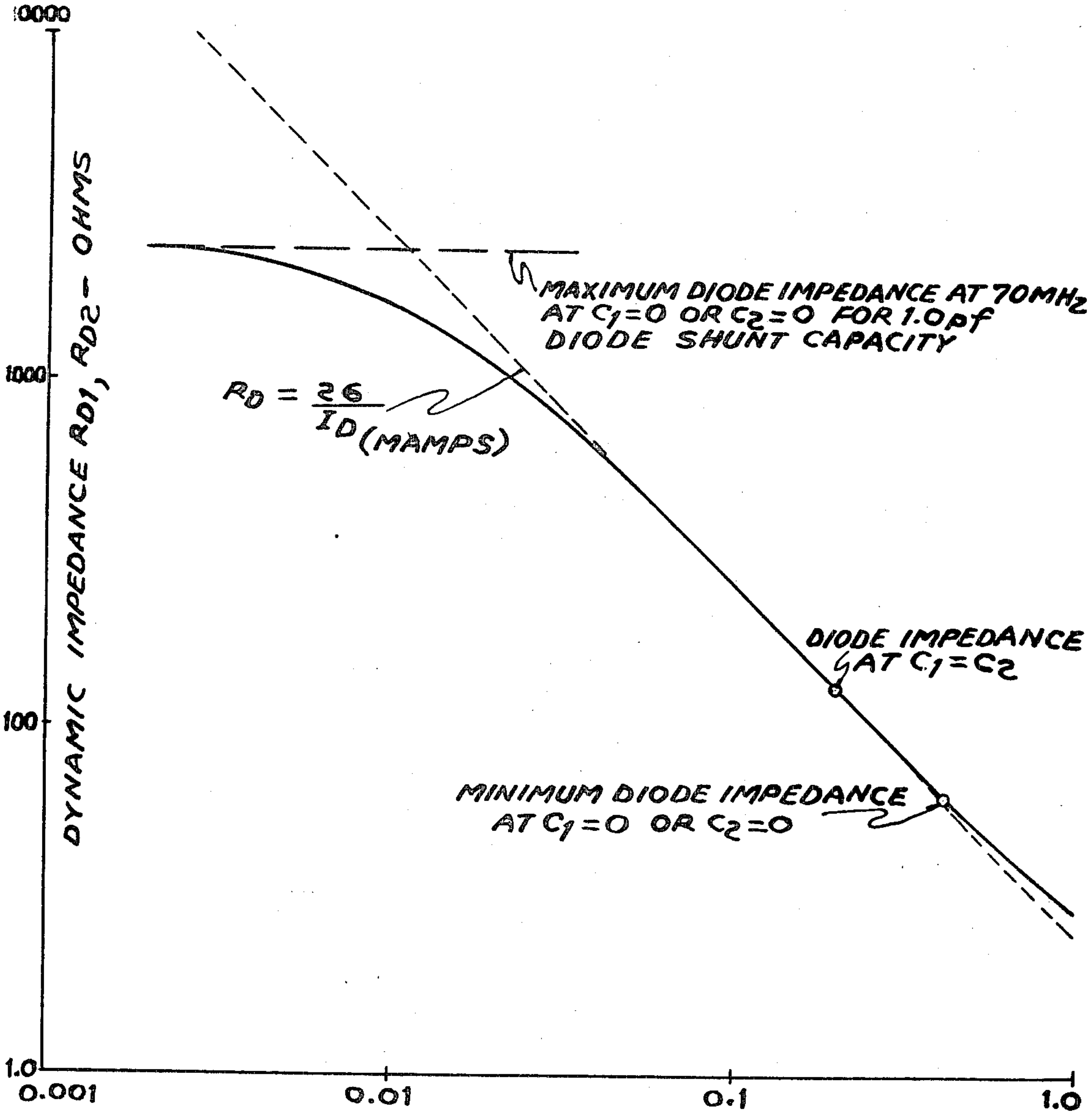
FIG. 3 is a graph illustrating the dynamic impedance variation for a Solitron MS 7330 diode that may be employed as the variable impedance diodes of FIG. 1.

The 70 MHz. series impedance of each of diodes D1 and D2 is a function of the magnitude of the DC current through the diode as shown in FIG. 3. The DC current, in turn, is a function of the relative carrier signal strengths, $C_1$ and $C_2$, and varies in such a way as to produce signal attenuation on a maximal-ratio basis.

Figure 2:
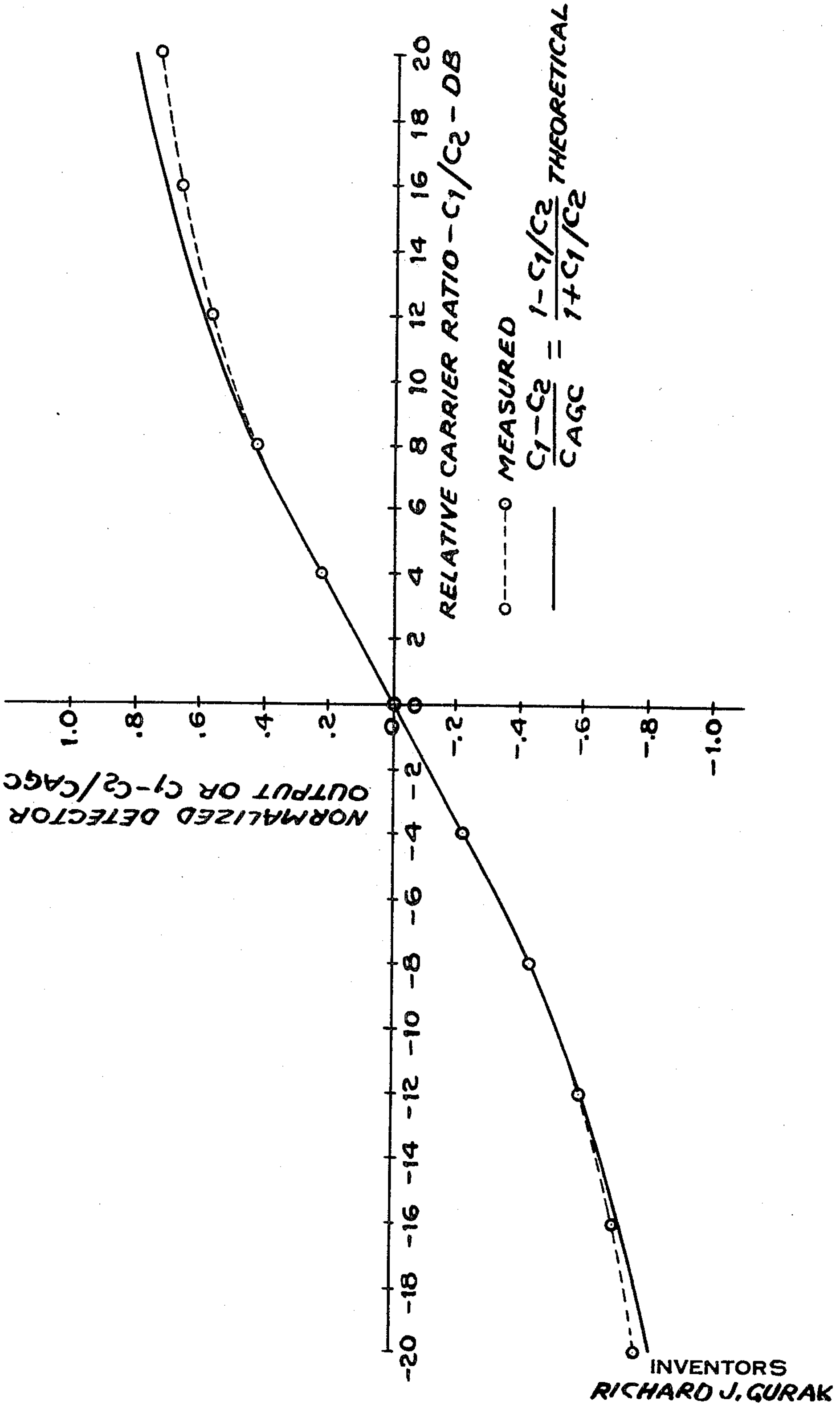
FIG. 2 is a graph of the detected carrier level differences illustrating how the control voltages for the variable impedance diodes of the DC (direct current) control circuit of FIG. 1 are produced.

In control circuit 10, it is essential that the DC control voltage $V1$ and $V2$ be directly proportional to the difference in carrier signal levels, $C_1-C_2$ or $C_2-C_1$ as shown in FIG. 2. The curves in FIG. 2 are plots of the measured normalized DC output $V1$ or $V2$ and the theoretical normalized carrier difference equation, as a function of the relative carrier level $C_1/C_2$ and $C_2/C_1$. The close agreement of the measured and theoretical curves indicates the validity of the assumed proportionality Diode currents $I_{D1}$ and $I_{D2}$ are a continuously varying function of $C_1$ and $C_2$. $I_{D1}$ and $I_{D2}$ determine the magnitude of the dynamic diode impedance, $R_{D1}$ and $R_{D2}$, at 70 MHz.

$V1=A1\,(C_1-C_2)$ and $V2=A2\,(C_2-C_1)$, where $A1$ is the gain of amplifier 20 and $A2$ is the gain of amplifier 25.

It follows from the circuit of FIG. 1 where resistors 21 and 26 have a resistance value = $R$ and resistor 16 has a resistance value = $R1$ that:

$$I_{D1}=\frac{R+R1}{R(R+2R1)}\left[V1-V2\left(\frac{R1}{R+R1}\right)-V_{D1}+V_{D2}\left(\frac{R1}{R+R1}\right)-V_R\left(\frac{R}{R+R1}\right)\right]$$

and $$I_{D2}=\frac{R+R1}{R(R+2R1)}\left[V2-V1\left(\frac{R1}{R+R1}\right)-V_{D2}+V_{D1}\left(\frac{R1}{R+R1}\right)-V_R\left(\frac{R}{R+R1}\right)\right]$$

$V_{D1}$ and $V_{D2}$ is approximately equal to 0.5 volt DC (v. DC), which is negligible in comparison to the magnitude of the reference voltage $V_R$=−12 v. DC.

The individual gains $A1$ and $A2$ are adjusted so that:

$V2$=−$V1$

Therefore, with good approximation:

$$I_{D1}=\frac{V1}{R}-\frac{V_R}{R+2R1} \quad (3)$$

and $$I_{D2}=\frac{V2}{R}-\frac{V_R}{R+2R1} \quad (4)$$

The choice of $V_R$, $R$ and $R1$ depends on the desired range of operation of the dynamic diode impedances, $R_{D1}$ and $R_{D2}$. With the Solitron MS 7330 hot carrier diodes being used, see FIG. 3, they have a dynamic impedance which is closely approximated by $R_D$=26/$I_D$ ohms, where $I_D$ is in milliamps, in the most critical diode impedance range of operation. It is essential that this diode impedance characteristic, $R_D$=26/$I_D$, be at least nearly the same for both diodes $D1$ and $D2$.

The desired range of operation of $R_{D1}$ and $R_{D2}$ depends on the following:

1. The 70 MHz. source and load impedance seen by the diodes. The source impedance must be as low as possible (less than 10 ohms for the reduction to practice) and the load impedance must be as high as possible.

2. The diode impedance variation capability at 70 MHz. (see FIG. 3) which will provide the desired minimum and maximum 70 MHz. signal attenuation range.

3. The diode impedances must be sufficiently low so as not to cause phase shifts that may result in out-of-phase signal addition.

At equal carrier inputs, $C_1$=$C_2$:

$V1$=$V2$=0

Therefore, from Equations (3) and (4);

$I_{D1}=I_{D2}=-V_R/R+2R1$

A "nice" value for $R_{D1}$ and $R_{D2}$ at equal carrier signals that satisfy the above requirements is between 100 ohms and 200 ohms.

Let $R$=$R_1$ = 20 KΩ and $V_R$=−12 v. DC.

Therefore:

$I_{D1}=I_{D2}$ = 0.2 milliamp (ma.) and $R_{D1}=R_{D2}$ = 26/0.2 = 130 ohms at $C_1$=$C_2$ The boundary conditions for $R_{D1}$ and $R_{D2}$ occur when $C_1$=0 or $C_2$=0. For $C_1$=0: $I_{D1}$=0,$R_{D1}$ = maximum, $I_{D2}$ = maximum and $R_{D2}$ = minimum.

Therefore, from Equation (3):

$$0=\frac{V1}{20K}+\frac{12}{60K}$$

$$V1=-4\text{ V DC}$$

$$V2=-V1=+4\text{ V DC}$$

The amplifiers 20 and 25 must be capable of supplying linearly ±4 v. DC.

From Equation (4);

$$I_{D2}=\frac{4}{20K}+\frac{12}{60K}=0.4\text{ ma}$$

Therefore, the minimum value of $R_{D2}$ is:

$R_{D2}$ = 26/0.4 = 65 ohms

Conversely, for $C_2$ = 0: $I_{D2}$ = 0, $R_{D2}$ = maximum, $I_{D1}$ = 0.4 ma., and $R_{D1}$ = 65 ohms.

Hence, the range of operation for $R_{D1}$ and $R_{D2}$ is between 65 ohms and some higher impedance as determined by the diode equivalent circuit.

At 70 MHz. the maximum diode impedance is estimated at greater than 2,000 ohms. This provides about 25 db. (decibel) maximum attenuation of the weaker carrier signal.

The complete 70 MHz. equivalent circuit includes a source resistor for each of signals $C_1$ and $C_2$ in series with the series circuit including the diode resistance $R_{D1}$ and $R_{D2}$ with the output being taken across a load resistor connected in a parallel between ground and the appropriate diode resistance.

The source resistor is less than 10 ohms which is considered negligible and not included in the following analysis and the load resistor is greater than 5,000 ohms and is not considered in the following analysis.

The contribution of $C_1$ and $C_2$ to the maximal-ratio output $C_m$ is determined by the relative magnitude of $R_{D1}$ and $R_{D2}$, which are, in turn, controlled by $C_1$ and $C_2$.

$$Co_1=\frac{R_{D2}}{R_{D1}+R_{D2}}C_1$$

and $$Co_2=\frac{R_{D1}}{R_{D1}+R_{D2}}0_2$$

$$C_m=Co_1+Co_2,\ R_{D1}=\frac{26}{I_{D1}},\ R_{D2}=\frac{26}{I_{D2}}$$

Therefore:

$$C_m=\frac{26/I_{D2}}{26/I_{D1}+26/I_{D2}}C_1+\frac{26/I_{D1}}{26/I_{D1}+26/I_{D2}}C_2$$

This equation reduces to equation (5).

$$C_m=\underbrace{\frac{I_{D1}}{I_{D1}+I_{D2}}}_{K_1}C_1+\underbrace{\frac{I_{D2}}{I_{D1}+I_{D2}}}_{K_2}C_2 \quad (5)$$

If $k_1 \approx C_1$ and $K_2 \approx C_2$, then the maximal-ratio addition of $C_1$ and $C_2$ as specified in Equation (1) will be achieved.

Substituting Equations (3) and (4) into Equation (5) and simplifying results in:

$$C_m=\frac{C_1+C_2}{2}+\frac{C_1-C_2}{2}\cdot\frac{V1}{(-V_R)/(1+2R1/R)} \quad (6)$$

The next step is to obtain an equivalent expression for $$\frac{V1}{(-V_R)/(1+2R1/R)}$$

that contains only the carrier signals $C1$ and $C2$.

This can be accomplished by considering the common AGC circuit and the boundary conditions of signal operation.

The common AGC maintains the following:

$$C_1+C_2=C_{AGC}=\text{constant} \quad (7)$$

Rearranging Equation Equation (7) into a more convenient form results in $$C_1-C_2=C_{AGC}\frac{C_1-C_2}{C_1+C_2}$$

It follows from this expression that:

$$V1=A1(C_1-C_2)=A1C_{AGC}\frac{C_1-C_2}{C_1+C_2}$$

At one of the boundary conditions $C_2$ = 0, therefore:

$$V1=A1\ C_{AGC}=A1\ (C_1=C_2) \quad (8)$$

At this same boundary condition $I_{D2}$ = 0 and from Equation (5) $C_m = C_1$. Substituting $C_m = C_1$ and $C_2$ =0 into Equation (6) results in:

$$V1=\frac{(-V_R)}{1+\frac{2R1}{R}} \quad (9)$$

Substituting Equation (8) into Equation (9) results in the desired equivalent expression.

$$\frac{(-V_R)}{1+\frac{2R1}{R}}=A1(C_1+C_2) \qquad (10)$$

Substituting Equation (10) and $V1=A1\ (C_1-C_2)$ into Equation (6) results in:

$$C_m=\frac{C_1+C_2}{2}+\frac{C_1-C_2}{2}\cdot\frac{A1(C_1-C_2)}{A1(C_1+C_2)}$$

Simplifying results in:

$$C_m=\frac{C_1^2+C_2^2}{C_1+C_2}$$

According to Equation (7), $C_1+C_2$ is held constant by the common AGC, therefore:

$$C_m=\frac{C_1^2+C_2^2}{C_{AGC}}=\frac{C_1}{C_{AGC}}(C_1)+\frac{C_2}{C_{AGC}}(C_2) \qquad (11)$$

Therefore, comparing Equation (5) to Equation (11):

$K_1 \approx C_1$ and $K_2 \approx C_2$

Accordingly, maximal-ratio action is achieved.

The above analysis is predicated with the requirement that the 70 MHz. signal be sufficiently low so as not to upset the predicted dynamic impedance variations. Large 70 MHz. signals can cause a change in diode current due to signal self-rectification. This can be effectively eliminated by operating the DC control circuits between large DC voltages, such as $V_R = -12$ v. DC, in comparison to the self-rectified voltage.

In addition, large 70 MHz. signals can cause a change in the average dynamic impedance of the diode, because of the 70 MHz. voltage swing across the diode.

It has been determined empirically that 70 MHz. signal levels of 30 millivolts, root means square or less will result in little or no change in the average dynamic impedance.

Figure 4:
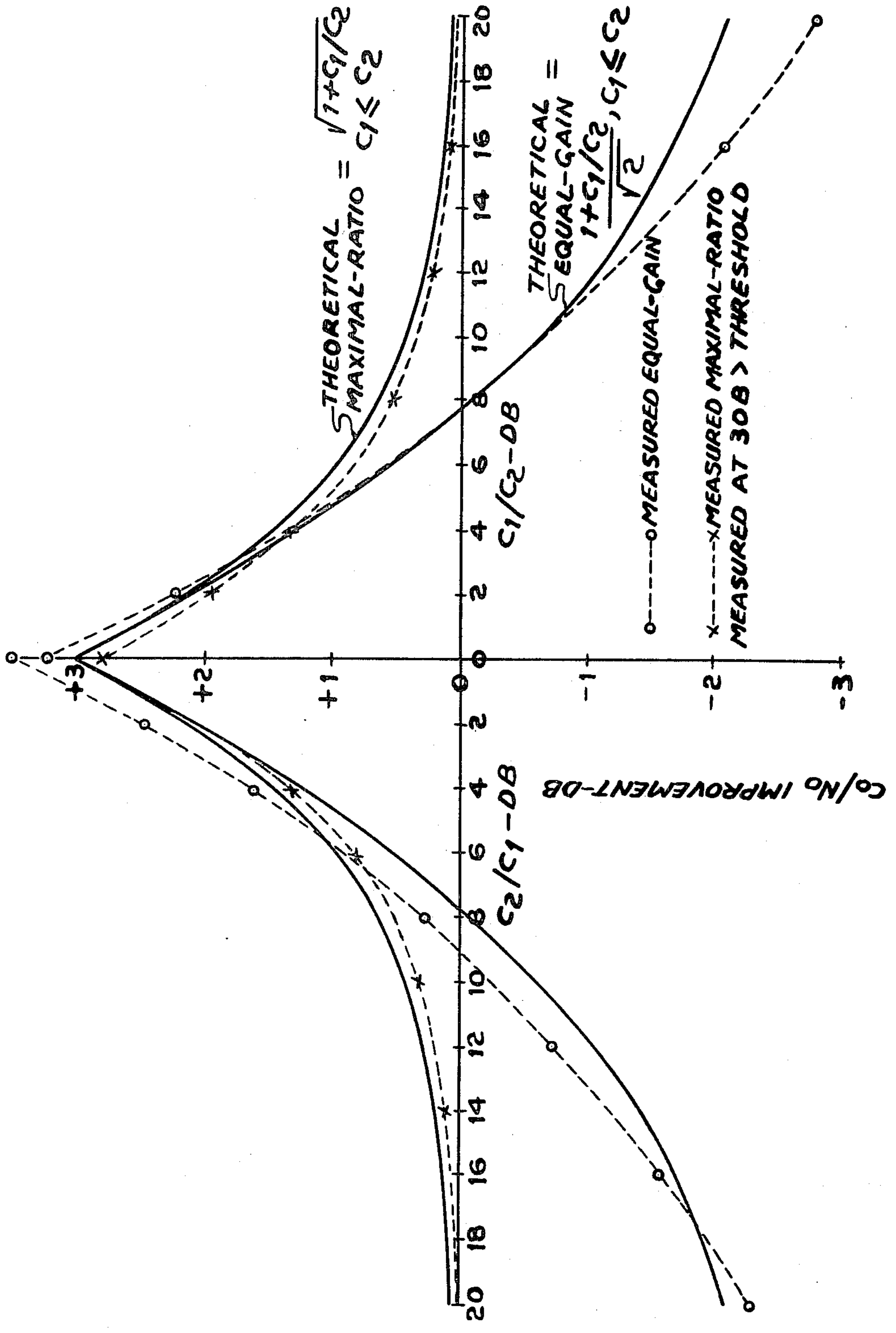
FIG. 4 is a graph illustrating the diversity improvement achieved by the combining techniques of the present invention.

Static diversity improvement characteristics have been measured employing a receiving system with an equal gain combiner and the maximal-ratio combiner of this invention. The results are plotted in FIG. 4 and show excellent correlation with the theoretical curves.

The only apparent drawback to the combiner of this invention, aside from it being strictly a dual combiner, is a 6 db. combined output level variation, which is not a serious problem, since an FM demodulator with limiting immediately follows the combiner, that is, is coupled to output 9 of FIG. 1.

$$C_m=\frac{C_1^2+C_2^2}{C_1+C_2}$$

At equal carrier signals $C_1=C_2$, therefore:

$$C_m=\frac{C_1^2+C_1^2}{C_1+C_1}=\frac{2C_1^2}{2C_1}=C_1$$

At $C_1=0$ or $C_2=0$, the common AGC causes $C_1$ or $C_2$ to increase to twice its level at the equal carrier signal condition.

$$C_m=\frac{(2C_1)^2}{2C_1}=\frac{4C_1^2}{2C_1}=2C_1$$

Therefore, the maximal-ratio output, $C_m$, will be 6 db. greater at the faded signal condition that at the equal signal condition.

Figure 5:
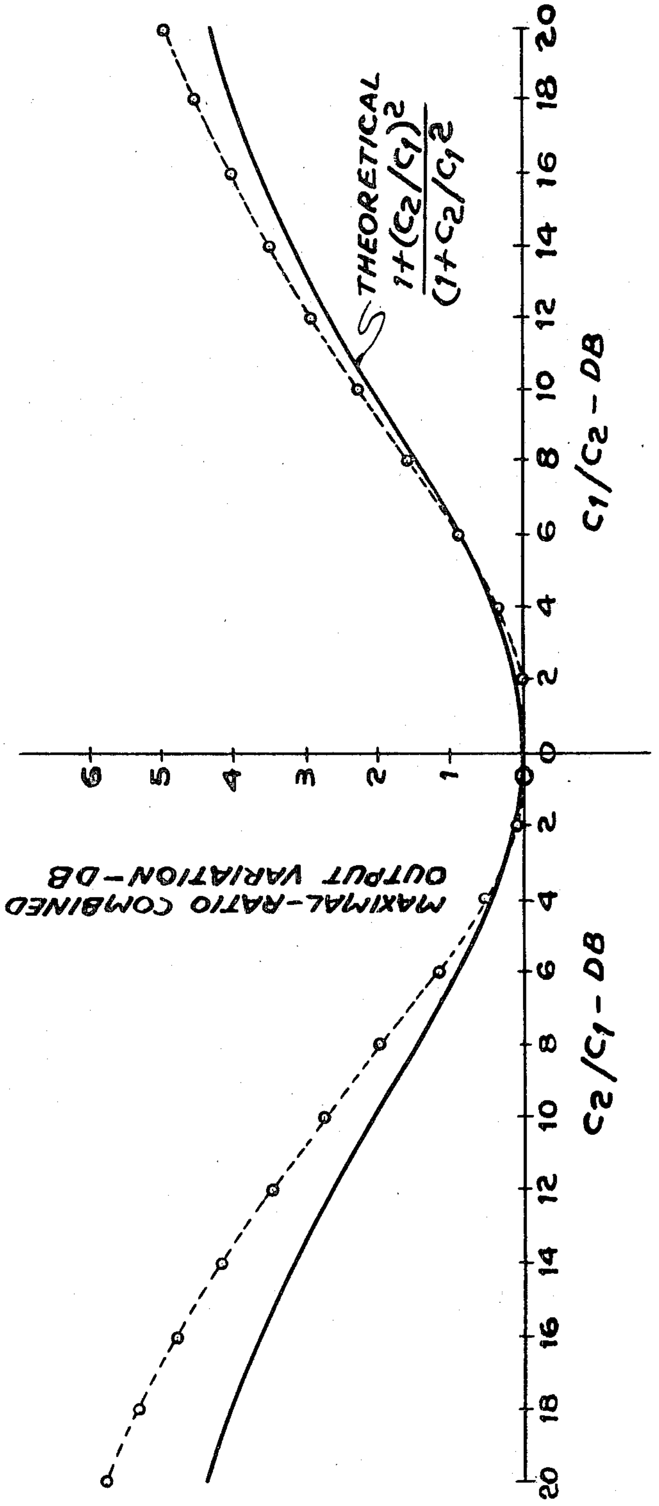
FIG. 5 is a graph illustrating the maximal-ratio combined output variation in accordance with the principles of this invention.

The measured and theoretical normalized, maximal-ratio output is plotted in FIG. 5 as a function of a relative carrier signal level.

Figure 6:
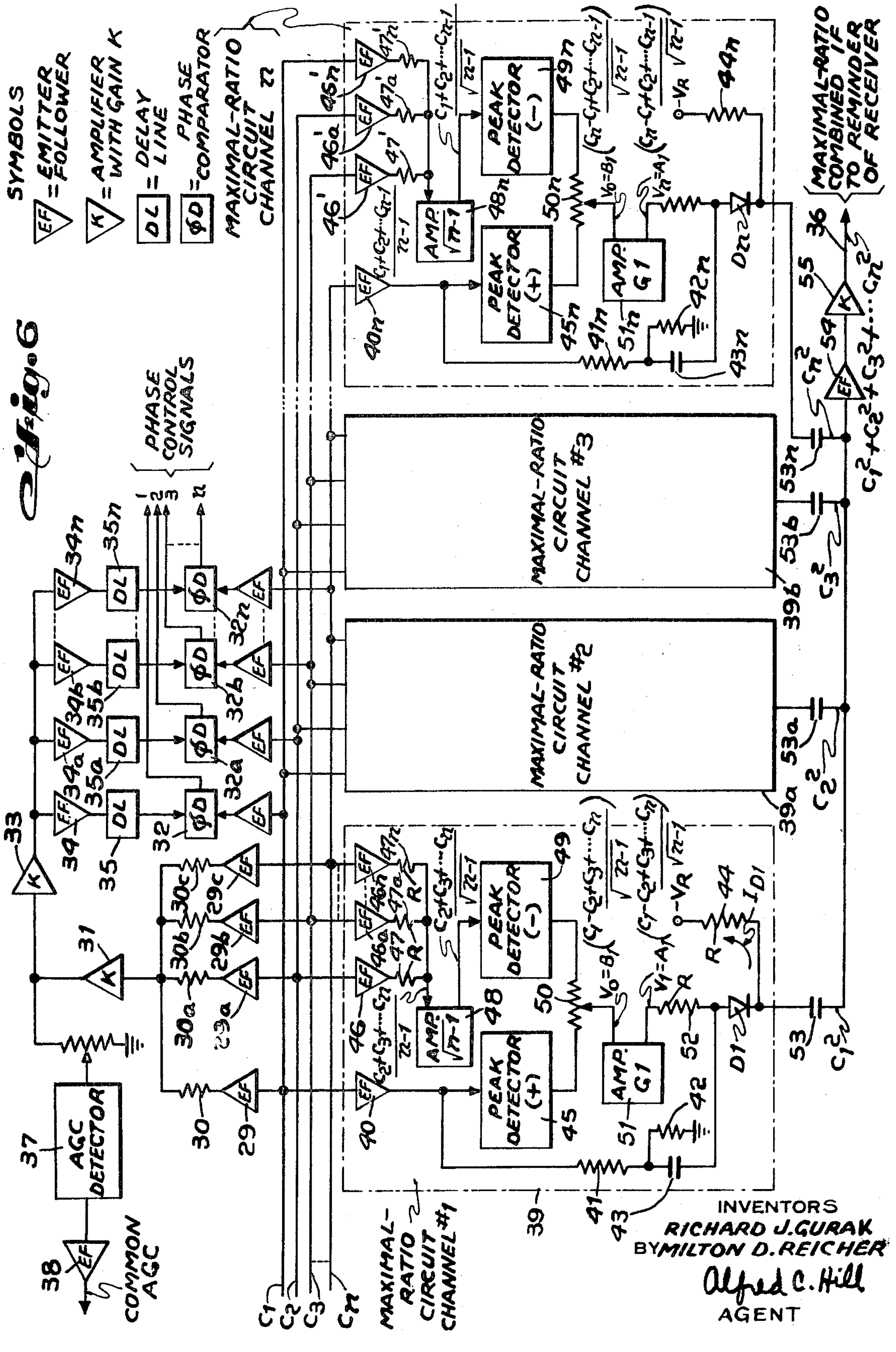
FIG. 6 is a block diagram of a predetection combining diversity receiving system in accordance with the principles of this invention having more than two diversity signals applied thereto.

The foregoing description and analysis has been based on a dual receiving system ($n$=2). Referring to FIG. 6, there is disclosed therein a maximal-ratio combining arrangement for a multiple fold diversity system where $n$ is greater than 2. As in the case of FIG. 1, the $n$ radio frequency signals are routed to separate channels each of which contain a mixer similar to mixer 1 and variable frequency oscillator source 2 to provide an IF signal at the output of mixer 1 in each diversity channel which has the same frequency. Each diversity signal channel further includes an IF amplifier with AGC similar to amplifier 3 of FIG. 1 to provide a signal $C_n$ in the associated signal channel. The signals of each diversity channel are combined through means of emitter followers 29 and resistors 30 for coupling to amplifier 31. As in FIG. 1, the IF signals are linearly combined with each of the IF signals being inphase with each other. The associated phase control signals are produced in phase comparators 32 each of which receive their associated signal C and a reference signal derived from the common output of amplifier 31. This reference signal is coupled from amplifier 31 through amplifier 33 and, hence, through emitter followers 34 to their associated delay lines 35. Thus, the phase control signals from phase comparators 32 will operate on the oscillator source of its associated channel to cause the IF signals to be inphase so that they may be linearly combined at the input to amplifier 31 and also at the output 36 which provides the maximal-ratio combined IF signal for utilization in the remainder of the receiver.

The common IF signal at the output of amplifier 31 is also coupled to AGC detector 37 to provide through emitter follower 38 the common AGC signal for gain control through means of IF amplifiers with AGC in the associated diversity channel.

The maximal-ratio circuits 39 are provided for each diversity signal channel. Each of circuits 39 control the impedance of its associated diode D1–D$n$ which is coupled to its associated signal channel through means of emitter follower 40, resistors 41 and 42 and capacitor 43. As in FIG. 1, a reference voltage $-V_R$ is coupled through resistor 44 to its associated diode such as diode D1. The output of emitter follower 40 is also coupled to positive peak detector 45. The remaining ($n$−1) signals are combined through the means of emitter followers 46 and resistors 47 to provide an output equal to the average amplitude of the remaining ($n$−1) carrier signal levels. This combined output is then coupled through amplifier 48 having a gain of $\sqrt{n-1}$. The output of amplifier 48 is then coupled to a negative peak detector 49. The DC outputs from detectors 45 and 49 are coupled to resistor 50 for algebraic addition therein. The voltage Vo is coupled to amplifier 51 which has a gain of G1 to produce the control voltage V1 which is coupled through resistor 52 to the input electrode of the associated diode, such as diode D1, for control of the impedance thereof.

The signal output from each of circuits 39 is coupled through a DC isolation capacitor 53 wherein each of the associated channel signals now is $C_n^2$ and are added inphase to provide a combined maximal-ratio IF signal which is applied through emitter follower 54 to amplifier 55 and, hence, to output 36.

In effect, the circuits 39 are subdivided into an IF attenuation circuit which includes diodes D1–D$n$, two DC current limiting resistors and a DC control circuit controlling the impedance of the associated diode. One of each of these circuits is required for each received signal.

The maximal-ratio combiner of FIG. 6 is intended to be used by a receiver with a common AGC so that the relative ratio of the signals in the receiver Rf inputs is preserved at the maximal-ratio combiner IF inputs. The operation of the maximal-ratio circuit upon each of these IF signals results in an IF signal combination on a square law basis, namely, $C_1^2+C_2^2+C_3^2+\ldots C_n^2$.

The IF attenuation circuit provides the additional IF gain control, which for each signal path is proportional to the strength of the IF signal in that signal path relative to the strength of the IF signals in the remaining ($n$−1) signal paths. The IF attenuation circuit consists of ($n$) hot carrier diodes, one diode for each IF signal path in a series-shunt arrangement, each diode being driven from a low impedance IF source into a high impedance IF load.

The range of operation of $R_{D1}$ and $R_{D2}$ is chosen so that the source resistance and the load resistance having negligible effect on the IF attenuation circuit performance. The minimum value of $R_{D1}$ is chosen to be the same as that disclosed hereinabove, 65 ohms, corresponding to a maximum diode current of $I_{D1} = 0.4$ ma. for the Solitron MS 7330 hot carrier diode.

The output of the IF attenuation circuit is given by:

$$Co_1 = \frac{\dfrac{1}{\dfrac{1}{R_{D2}}+\dfrac{1}{R_{D3}}+\dots\dfrac{1}{R_{Dn}}}}{\dfrac{1}{\dfrac{1}{R_{D2}}+\dfrac{1}{R_{D3}}+\dots\dfrac{1}{R_{Dn}}}+R_{D1}} C_1$$

For the Solitron MS 7330 diode $R_{Dn} = 26/I_{Dn}$. Therefore, substituting and simplifying the above expression results in Equation (12)

$$Co_1 = \frac{I_{D1}}{I_{D1}+I_{D2}+I_{D3}+\dots I_{Dn}} C_1 = K_1 C_1 \qquad (12)$$

where $I_{D1}, I_{D2}, I_{D3}, \dots I_{Dn}$ = diode DC current.

Maximal-ratio combining is achieved, when $$K_1 = \frac{I_{D1}}{I_{D1}+I_{D2}+I_{D3}+\dots I_{Dn}}$$

is proportional to $C_1$, thereby making $Co_1$ $_{proportional\ to}$ $C_1$. This is accomplished through proper diode current control by the DC control circuits.

The attenuator diode DC control circuit generates the DC voltages V1–V$n$ that control the IF attenuation diode DC currents. Consider the DC control circuit of FIG. 6 in diversity channel $C_1$. The detected IF signal in channel $C_1$ is compared to the detected sum of the IF signals in the remaining ($n$–1) channels. The resulting difference voltage Vo is amplified by amplifier 51 to produce DC control voltage V1, as given by Equation (13), that controls the diode current $I_{D1}$.

$$V1 = A1\left(C_1 - \frac{C_2+C_3+\dots C_n}{\sqrt{n-1}}\right)$$

where $A1 = G1B1$; $B1$ = peak detector transfer constant; $G1$ = DC amplifier gain of amplifier 51; $V1$ = *DC control voltage;* $C_1$, $C_2$, $C_3 \dots C_n$ = IF input signals and $n$ = order of diversity.

$V1$ is then applied to diode D1 through suitable current determining resistor 52 and 44 to control the diode current $I_{D1}$. Similar diode current control occurs for the diode in the remaining ($n$–1) channels thereby achieving the maximal-ratio performance indicated hereinabove.

The amplification of the IF signals prior to peak detection is such that the level of the sum of the ($n$–1) signals is divided by $\sqrt{n-1}$ in amplifier 48. This prevents an unbalance in the peak detector output voltage Vo due to noise, when there is a complete fade of all the signals. During this zero signal condition, the receiver common AGC equally increases the IF signal path gains to the extent that the IF noise levels at the combiner inputs are of sufficient magnitude to generate DC voltage at the output of diode detectors 45 and 49. Division by $\sqrt{n-1}$ produces equal IF noise levels at the peak detector inputs, hence, equal DC voltage at their outputs resulting in a zero input to amplifier 41 and, thus, voltage V1 is maintained at zero volts DC for the zero signal condition. For example, during a zero signal condition;

$$V1 = A1\left(\frac{N_1 - \sqrt{N_2^2+N_3^2+\dots N_n^2}}{\sqrt{n-1}}\right)$$

where $N_1, N_2, N_3, \dots N_n$ = combiner input IF noise levels.

For $N = N_2 = N_3 = \dots N_n$, which is the usual condition $$V1 = A1\left(N_1 - \frac{\sqrt{n-1}N_1}{\sqrt{n-1}}\right) = 0$$

If resistor 44 and 52 have a value of R, it follows that the diode current $I_{D1} = V1+V_R/2R$ (14)

where $V_R$ = negative reference voltage; $R$ equals the value of the current determining resistors 44 and 52 and $V1$=DC control voltage.

The solution to Equations (12), (13) and (14) are obtained under the specific boundary conditions imposed by the received IF signals. The specific IF signal boundary conditions for signal $C_1$ are:

1. Maximum signal $C_2+C_3+\dots C_n=0$
2. Zero signal: $C_1=0$

For any of these signal boundary conditions, the receiver common AGC maintains the following:

$$C_1+C_2+C_3+\dots C_n = C_{AGC} = \text{Constant} \qquad (15)$$

Consider the first boundary condition, $C_2+C_3+\dots C_n=0$, where $C_1$ is at a maximum.

From Equation (15) $C_1 = C_{AGC}$

From Equation (13) the DC control voltage is a positive (+) maximum.

$$V1 = A1(C_1) = BA1\ C_{AGC} = V1_{max}$$

where $V1_{max}$ = maximum output of amplifier 51.

Consider the second boundary condition $C_1=0$, where $C_1$ is completely faded.

From Equation (15), $C_2+C_3+\dots C_n = C_{AGC}$.

From Equation (13), the DC voltage $V1$ is a negative (–) maximum.

$$V1 = -A1\frac{C_2+C_3+\dots C_n}{\sqrt{n-1}} = -A1\frac{C_{AGC}}{\sqrt{n-1}} = \frac{V1_{max}}{\sqrt{n-1}}$$

From Equation (12), when $C_1$ is a minimum, the gain $K_1$ must also be at a minimum. This occurs when $I_{D1}=0$. The minimum value of $K_1$ is zero. Substituting into Equation (14) yields:

$$I_{D1} = 0 = \frac{\dfrac{-V1_{max}}{\sqrt{n-1}} + V_R}{2R}$$

Solving for $V_R$ yields:

$$V_R = \frac{V1_{max}}{\sqrt{n-1}}$$

Therefore:

$$I_{D1} = \frac{V1 + \dfrac{V1_{max}}{\sqrt{n-1}}}{2R} \qquad (16)$$

Equation (16) is equally applicable to the remaining IF signals.

Only the appropriate IF signal subscripts for the diode current and $V1$ need be changed.

Substituting Equations (13) and (15) into equation (16) and simplifying yields Equation (17).

$$I_{D1} = \frac{A1C_1}{2R}\left(1+\frac{1}{\sqrt{n-1}}\right) \qquad (17)$$

Substituting Equation (17) for $I_{D1}$ and the corresponding equations for $I_{D2}, I_{D3}$, and $\dots I_{Dn}$ into Equation (12) and simplifying yields Equation (18)

$$K_1 = \frac{C_1}{C_1+C_2+C_3+\dots C_n} \qquad (18)$$

But from Equation (15), $C_1+C_2+C_3+\dots C_n = C_{AGC}$ = constant. Therefore $K_1$ is proportional to $C_1$, thus satisfying the gain control requirement for maximal-ratio combining.

There are certain factors in the maximal-ratio combiner arrangement of FIG. 6 which impose a practical limit on the order of diversity ($n$). Specifically, these limitations are the impedance levels at the maximal-ratio combining point and the detection efficiency of the peak detectors in circuit 39. Each IF signal "sees" its own diode impedance in series with the remaining ($n$–1) diodes in shunt.

Theoretically, the maximum diode impedance is infinite. Practically, 2,000 ohms is a more realistic value. Therefore, the maximum shunt impedance is 2,000/($n-1$) in parallel with the load resistance. As $n$ increases the maximum shunt impedance decreases, thereby increasing the loss across diode D1 for the signal C1 in the channel carrying C1. This, in turn, introduces errors in maximal-ratio signal combining. It is estimated that $n$=6 is a practical limit to this technique.

The DC control voltage V1, as given by Equation (13), shows that the sum of the ($n-1$) signals term is:

$$\frac{C_2+C_3+\ldots C_n}{\sqrt{n-1}}$$

As ($n$) increases the magnitude of the above expression decreases; thus, $V1$ is less sensitive to changes in $C_2+C_3+\ldots C_n$ for large values of $n$ and more susceptible to other circuit variations.

While we have described above the principles of our invention in connection with specific apparatus, it is to be more clearly understood that this description is made only by way of example and not as a limitation to the scope of our invention as set forth in the objects thereof and in the accompanying claims.

We claim:

1. A diversity receiving system of the predetection combining type comprising:

$n$ sources of signals, the signals of each of said sources having random phase relation with respect to each other, where $n$ is an integer greater than one;

first means coupled to said sources to provide $n$ intermediate frequency signals each having the same frequency;

$n$ gain control means each coupled to said first means responsive to a different one of said intermediate frequency signals;

$n$ variable impedance means each coupled to a different one of said gain control means;

second means coupled to said gain control means to linearly combine said intermediate frequency signals;

third means coupled to the output of said second means, the output of each of said gain control means and said first means to vary the phase relation of said intermediate frequency signals to render said intermediate frequency signals inphase at the outputs of said first means;

fourth means coupled to the output of said second means to produce a control signal for coupling to each of said gain control means to control the amplitude of each of said intermediate frequency signals to produce a constant amplitude signal at the output of said second means;

fifth means coupled to the output of each of said gain control means and each of said variable impedance means to control the impedance of each of said variable impedance means to provide square law signal addition; and sixth means coupled to each of said variable impedance means to combine said intermediate frequency signals and provide a maximal-ratio combined output intermediate frequency signal for said system.

2. A system according to claim 1, wherein each of said gain control means includes an intermediate frequency amplifier with automatic gain control means; and further including a conductor interconnecting each of said amplifiers to compensate for variations therein.

3. A system according to claim 1, wherein each of said variable impedance means includes a diode.

4. A system according to claim 1, wherein said third means includes $n$ phase comparators each coupled to the output of a different one of said gain control means and said second means, the outputs of each of said phase comparators being coupled to said first means to vary the phase relation of said intermediate frequency signals to render said intermediate frequency signals inphase at the outputs of said first means.

5. A system according to claim 1, wherein said first means includes $n$ mixer means each coupled to a different one of said sources, and $n$ variable frequency oscillator means each coupled to a different one of said mixer means, each of said oscillator means being controlled by said third means to vary the phase relation of said intermediate frequency signals to render said intermediate frequency signals inphase at the outputs of said mixer means.

6. A system according to claim 1, wherein $n$ is equal to two;

said variable impedance means includes a first diode having its input electrode coupled to the output of one of said gain control means and its output electrode coupled to said sixth means, and a second diode having its input electrode coupled to the output of the other of said gain control means and its output electrodes coupled to said sixth means; and said fifth means includes a reference voltage coupled to the output electrodes of each of said first and second diodes, seventh means coupled to the output of both of said gain control means to produce a first voltage equal to the algebraic addition of the positive peak of one of said intermediate frequency signals and the negative peak of the other of said intermediate frequency signals, said first voltage being coupled to the input electrode of said first diode, and eight means coupled to the output of both of said gain control means to produce a second voltage equal to the algebraic addition of the positive peak of said other of said intermediate frequency signal and the negative peak of said one of said intermediate frequency signals, said second voltage being coupled to the input electrode of said second diode.

7. A system according to claim 6, wherein said seventh means includes a first positive peak detector coupled to one of said gain control means, a first negative peak detector coupled to the other of said gain control means, a first resistor coupled between the outputs of said first positive and negative peak detectors, and a first amplifier coupled to said first resistor to provide said first voltage; and said eighth means includes a second positive peak detector coupled to said other of said gain control means, a second negative peak detector coupled to said one of said gain control means, a second resistor coupled between the outputs of said second positive and negative peak detectors, and a second amplifier coupled to said second resistor to provide said second voltage.

8. A system according to claim 1, wherein $n$ is equal to an integer greater than two;

each of said variable impedance means including a diode having its input electrode coupled to a different one of said gain control means and its output electrode coupled to said sixth means; and said fifth means includes $n$ maximal-ratio circuits each coupled to a different one of said diodes and the output of all of said gain control means to control the impedance of the associated one of said diodes to provide square law signal addition.

9. A system according to claim 8, wherein each of said maximal-ratio circuits includes a reference voltage coupled to the output electrode of the associated one of said diodes, and seventh means coupled to the output of all of said gain control means to produce a control voltage equal to the algebraic addition of the positive peak of one of said intermediate frequency signals and the negative peak of a predetermined value of the remaining $(n-1)$ of said intermediate frequency signal, said control voltage being coupled to the input electrode of the associated one of said diodes.

10. A system according to claim 9, wherein said seventh means includes a positive peak detector coupled to the output of one of said gain control means, eighth means coupled to the output of the remaining $(n-1)$ of said gain control means to provide a signal equal to the average value of the remaining $(n-1)$ of said intermediate frequency signals, a first amplifier having a predetermined gain coupled to the output of said eighth means, a negative peak detector coupled to the output of said first amplifier, a resistor coupled between the output of said positive and negative peak detector, and a second amplifier having a given gain coupled to said resistor to provide said control voltage for coupling to the input electrode of the associated one of said diodes.

* * * * *